(12) United States Patent
Mahajan

(10) Patent No.: US 7,570,941 B2
(45) Date of Patent: Aug. 4, 2009

(54) METHOD ENABLING DETECTION OF STOLEN MOBILE COMMUNICATION DEVICES AND SYSTEMS THEREOF

(75) Inventor: Sunil Mahajan, Gurgaon (IN)

(73) Assignee: Aricent Inc., George Town, Grand Cayman (KY)

( * ) Notice: Subject to any disclaimer, the term of this patent is extended or adjusted under 35 U.S.C. 154(b) by 205 days.

(21) Appl. No.: 11/469,852

(22) Filed: Sep. 2, 2006

(65) Prior Publication Data

US 2007/0077912 A1    Apr. 5, 2007

(30) Foreign Application Priority Data

Sep. 2, 2005    (IN)    ............ 2054/DEL/2005

(51) Int. Cl.
*H04M 1/66* (2006.01)
*H04M 1/00* (2006.01)
*H04W 4/00* (2006.01)

(52) U.S. Cl. .............. 455/411; 455/435.1; 455/558
(58) Field of Classification Search ......... 455/410–411, 455/558, 435.1
See application file for complete search history.

(56) References Cited

U.S. PATENT DOCUMENTS

| | | | |
|---|---|---|---|
| 5,940,589 A * | 8/1999 | Donovan et al. ............ 726/4 |
| 6,148,192 A * | 11/2000 | Ahvenainen ............ 455/410 |
| 6,400,939 B1 * | 6/2002 | Virtanen et al. ............ 455/410 |
| 6,665,529 B1 | 12/2003 | Mills, Jr. |
| 6,836,654 B2 | 12/2004 | Decotignie |
| 2003/0027569 A1 * | 2/2003 | Ejzak ............ 455/432 |
| 2003/0114191 A1 * | 6/2003 | Nishimura ............ 455/557 |
| 2005/0280557 A1 | 12/2005 | Jha et al. |
| 2006/0089120 A1 * | 4/2006 | Luo et al. ............ 455/410 |

OTHER PUBLICATIONS

3GPP TS 23.228 ARIB STD-T63-23.228 V6.10.0 IP Multimedia Subsystem (IMS).*

* cited by examiner

*Primary Examiner*—Nick Corsaro
*Assistant Examiner*—Michael Mapa
(74) *Attorney, Agent, or Firm*—Workman Nydegger (57) ABSTRACT

A method enabling the detection of stolen mobile communication devices by configuring a Centralized Equipment Identification Register (C-EIR) (120), identifying the Equipment Identification Numbers of stolen mobile communication devices, storing the Equipment Identification Numbers of stolen mobile communication devices in a repository (380) and enabling third party retrieval of the Equipment Identification Numbers of stolen mobile communication devices thus enabling detection of the stolen mobile communication devices and related systems.

15 Claims, 10 Drawing Sheets

METHOD ENABLING DETECTION OF STOLEN MOBILE COMMUNICATION DEVICES AND SYSTEMS THEREOF

BACKGROUND OF THE INVENTION

1. Field of the Invention

The present invention, in general, relates to the field of mobile communications. More particularly, the present invention provides a method enabling detection of stolen mobile communication devices with the help of a centralized data repository configurable to provide third party access to equipment identification numbers of stolen mobile communication devices.

2. Description of the Related Art

Communication devices employing mobile communication technologies have separated subscriber identity from the device that is used for communication. For instance: this makes any GSM device transferable from subscriber to subscriber, or allows users to change their subscription from one service provider to another retaining the same device. While this enables the consumers at large to invest one-time in a mobile communication device and make use of the competitive services of the network service providers at will, it has a negative fall out of permitting a mobile phone thief to steal a mobile device and either use it or sell it in the market. Mobile Phone theft has become a big social menace in many countries and there are not many solutions to this problem. This invention thereby produces a solution to trace stolen mobile communication devices and thus discourages theft.

Each mobile communication device carries a unique device-id (device identification) which is known as International Mobile Equipment Identity (IMEI) in Global System for Mobile Communications (GSM). This device-id can be used by a network service provider to block a mobile communication device, if the mobile communication device is stolen and can also be used to trace the mobile communication device if stolen and reused by somebody else. GSM network architecture has a node defined in the network called Equipment Identification Register (EIR), which maintains list of black listed, white listed and grey listed mobile communication devices. If a mobile communication device is stolen or lost, the concerned network service provider puts the device-id of the stolen mobile communication device in the black list of the EIR. Whenever the stolen mobile communication device tries to register onto the communication network, the EIR can be checked by the GSM infrastructure to check if it is among the black listed mobile communication devices. If it is included in the black listed mobile communication device, it can be blocked. Further the user of said mobile communication device can be traced.

GSM provides a method of blocking and tracing mobile communication device if stolen or lost. However, there are some drawbacks in the known methods, which makes this approach inefficient. As for example, there are instances when most users do not take note of the device-id of a mobile communication device. If a mobile communication device is stolen, because of the user not knowing its device-id, it's not possible for him/her to notify the network service provider and in turn difficult for the network service provider to block the mobile communication device. There are many mobile communication infrastructure worldwide where EIRs are not deployed, so if mobile communication devices are stolen it can't be traced. Mobile communication devices can move across network service providers and also across countries, so if a mobile communication device leaves a network (or service provider) it is not possible to trace it, within a single service provider's network. This encourages a thief to steal a mobile communication device and export it out of a country. Therefore, to trace such stolen mobile communication devices, entries thereof have to be made in all EIRs across the globe, which is not feasible. The present invention addresses the aforesaid prior art problems and provides a method that enables detection of stolen mobile communication devices.

Prior Art

U.S. Pat. No. 6,665,529 to Mills, Jr. is directed at a technique for determination of authentication of the subscriber while attempting to register with the network, based on data associated with the subscriber stored at an address specific to the subscriber. The invention includes a definition of the Equipment Identity Register (EIR) for Global System for Mobile Communication GSM networks. It defines the role and procedures for a standard EIR for GSM networks, however EIRs are limited to one network and interfaces with single network service providers.

U.S. Pat. No. 6,836,654 to Decotignie defines a mechanism by which a mobile device can be locked and can be made unusable by blocking the device when either mobile is not in use for some time or there is change in the identity of subscription card. The invention does not teach a method that enables detection of the mobile device if it is used by some other person when stolen by reporting the Equipment Identity Number to a centralized database on detection of change in the subscriber identification.

U.S. Pat. No. 6,400,939 to Virtanen et al relates to a mechanism for supervising the terminal equipments of the home subscriber and determining the allowed terminals corresponding to limiting identity providing limiting use.

US Patent Application No. 20050280557 to Jha, Anjali et. al relates to a mechanism for providing the geographical location of the mobile devices for a particular status determined by the conventional process for determining the status of the mobile communication device. The method of detecting the status of mobile device (stolen, lost etc.) is based on conventional GSM method of updating EIR, which has shortcomings as resolved in this invention. Further, the centralized database as disclosed in the text description collects the status information of the mobile communication device from the EIRs associated with communication networks.

The abovementioned prior arts provide different techniques for blocking services to malicious users and tracking. However, none of the prior arts either alone or in combination thereof, suggest the method enabling detection of theft of the mobile communication devices and the associated system disclosed in the present invention.

SUMMARY OF THE INVENTION

It is a principal aspect of the present invention to devise a method enabling the detection of stolen mobile communication devices by configuring a Centralized Equipment Identification Register (C-EIR), devising a step of identifying the Equipment Identification Numbers of stolen mobile communication devices, storing the Equipment Identification Numbers of stolen mobile communication devices in a repository and enabling third party retrieval of the Equipment Identification Numbers of stolen mobile communication devices thus enabling detection of the stolen mobile communication devices.

It is another aspect of the present invention to devise a method enabling the detection of stolen mobile communication devices, wherein said method is implemented in a communication network comprising mobile device in wireless communication with the network.

In accordance with another aspect of the present invention the present invention discloses a system that enables detection of stolen mobile communication devices, wherein said system is employed in a communication network comprising a mobile device in wireless communication with the network.

These and other aspects of the invention are described below in different embodiments of the invention, however the invention is not restricted to particular embodiments described herein after.

In accordance with a preferred embodiment of the present invention, there is provided a method enabling detection of stolen mobile communication devices by reading a pre-stored number residing in a device memory of a mobile communication device and a subscriber identification number stored in a subscriber identification storage module of said mobile communication device by a means for reading pre-stored number and subscriber identification number in the event of said mobile communication device powering on in a communication network wherein the means for reading resides in said device memory of said mobile communication device, comparing said pre-stored number and said subscriber identification number by a means for comparing said pre-stored number and said subscriber identification number, wherein said means for comparing resides in said device memory of said mobile communication device, triggering a message by a means for triggering a message in the event said comparing means finds said subscriber identification number not to correspond to said pre-stored number, transmitting said message to a centralized equipment identification register (C-EIR) residing in said communication network by a means for transmitting messages, wherein said message comprises said pre-stored number, said subscriber identification number and an equipment identification number, storing said subscriber identification number in said device memory by a means for storing subscriber identification number and repeating the steps of reading a pre-stored number residing in a device memory of a mobile communication device and a subscriber identification number stored in a subscriber identification storage module of said mobile communication device, comparing said pre-stored number and said subscriber identification number, triggering a message, and transmitting said message to a centralized equipment identification register, wherein when said steps are performed, said pre-stored number is substituted by said subscriber identification number by said means for storing subscriber identification number, receiving said message from said transmitting means by a means for receiving a message, wherein said receiving means resides in said centralized equipment identification register (C-EIR), reading said message by a means for reading a message, said means for reading a message residing in said centralized equipment identification register (C-EIR), comparing said equipment identification number retrieved from said message with equipment identification number enlisted in said centralized equipment identification register (C-EIR) by a means for comparing said equipment identification number with any one of the plurality of the equipment identification numbers contained in a repository of equipment identification numbers corresponding to stolen mobile communication devices, wherein said means for comparing resides in said centralized equipment identification register (C-EIR), identifying the equipment identification number retrieved from said message corresponding to equipment identification numbers contained in a first repository of equipment identification numbers corresponding to stolen mobile communication devices and reporting said identified equipment identification number of stolen mobile communication devices by a means for reporting identified equipment identification number to a second repository configured to receive identified equipment identification number, wherein said second repository is configurable to provide third party access to equipment identification numbers of stolen mobile communication devices.

In accordance with another embodiment of the present invention, there is provided a method enabling detection of stolen mobile communication devices, wherein said method further comprises storing said equipment identification number in said device memory by said means for storing.

In accordance with yet another embodiment of the present invention, there is provided a method enabling detection of stolen mobile communication devices, wherein the subscriber identification number and the equipment identification number are stored in an encrypted format.

In accordance with still another embodiment of the present invention, there is provided a method enabling detection of stolen mobile communication devices, wherein the centralized equipment identification register (C-EIR) address is stored in an encrypted format.

In accordance with another embodiment of the present invention, there is provided a method enabling detection of stolen mobile communication devices, wherein said method further comprises reporting said message to a third repository configurable to store equipment identification numbers not reported as stolen by a means for reporting message, in the event the equipment identification number retrieved from said message does not correspond to the equipment identification numbers contained in said first repository configurable to store equipment identification numbers corresponding to stolen mobile communication devices.

In accordance with one other embodiment of the present invention, there is provided a method enabling detection of stolen mobile communication devices, wherein said method further comprises reporting said message to a fourth repository configurable to store message by a means for reporting in the event said equipment identification number retrieved from said message is not enlisted in a fifth repository (300) configurable to store enlisted equipment identification numbers.

In accordance with yet another embodiment of the present invention, there is provided a system enabling detection of stolen mobile communication devices, wherein the system comprises a means for reading a pre-stored number residing in a device memory of a mobile communication device and a subscriber identification number stored in a subscriber identification storage module of said mobile communication device in the event said mobile communication device powers on in a communication network, wherein said means for reading resides in said device memory of said mobile communication device, a means for comparing pre-stored number and subscriber identification number, wherein said means for comparing resides in said device memory of said mobile communication device, a means for triggering a message in the event said comparing means finds the subscriber identification number not to correspond to said pre-stored number, a means for transmitting a message to a centralized equipment identification register (C-EIR) residing in said communication network, wherein said message comprises said pre-stored number, said subscriber identification number and an equipment identification number, a means for storing a subscriber identification number in said device memory by substituting said pre-stored number, a means for receiving a message from said transmitting means, wherein said receiving means resides in said centralized equipment identification register (C-EIR), a means for reading a message, said means for reading message residing in said centralized equipment identification register (C-EIR), a means for comparing equipment identification number retrieved from said message with equipment identification number enlisted in said centralized equipment identification register (C-EIR) with any one of the plurality of the equipment identification numbers contained in a first repository configurable to store equipment identification numbers corresponding to stolen mobile communication devices, said means for comparing residing in said centralized equipment identification register (C-EIR), a means for identifying equipment identification number retrieved from said message corresponding to equipment identification numbers contained in said first repository configurable to store equipment identification numbers corresponding to stolen mobile communication devices and a means for reporting identified equipment identification number to a second repository configured to receive identified equipment identification number, wherein said second repository is configurable to provide third party access to equipment identification numbers of stolen mobile communication devices.

In accordance with yet another embodiment of the present invention, there is provided a system enabling detection of stolen mobile communication devices, wherein the system further comprises said means for reporting said message to a third repository of equipment identification numbers not reported as stolen in the event the retrieved equipment identification number does not correspond to the equipment identification numbers contained in said first repository of equipment identification numbers corresponding to stolen mobile communication devices.

In accordance with yet another embodiment of the present invention, there is provided a system enabling detection of stolen mobile communication devices, wherein the system comprises said means for reporting a message to a fourth repository configurable to store said message in the event the retrieved equipment identification number is not enlisted in said centralized equipment identification register (C-EIR).

In accordance with yet another embodiment of the present invention, there is provided a system enabling detection of stolen mobile communication devices, wherein said centralized equipment identification register (C-EIR) is deployed as a direct device in the network.

BRIEF DESCRIPTION OF THE DRAWING FIGURES

Further aspect of the present invention together with additional features contributing thereto and advantages accruing there from will be apparent from the description of preferred embodiments of the present invention which are shown in the accompanying drawing figures.

DETAIL DESCRIPTION OF THE PREFERRED EMBODIMENT

Figure 1:
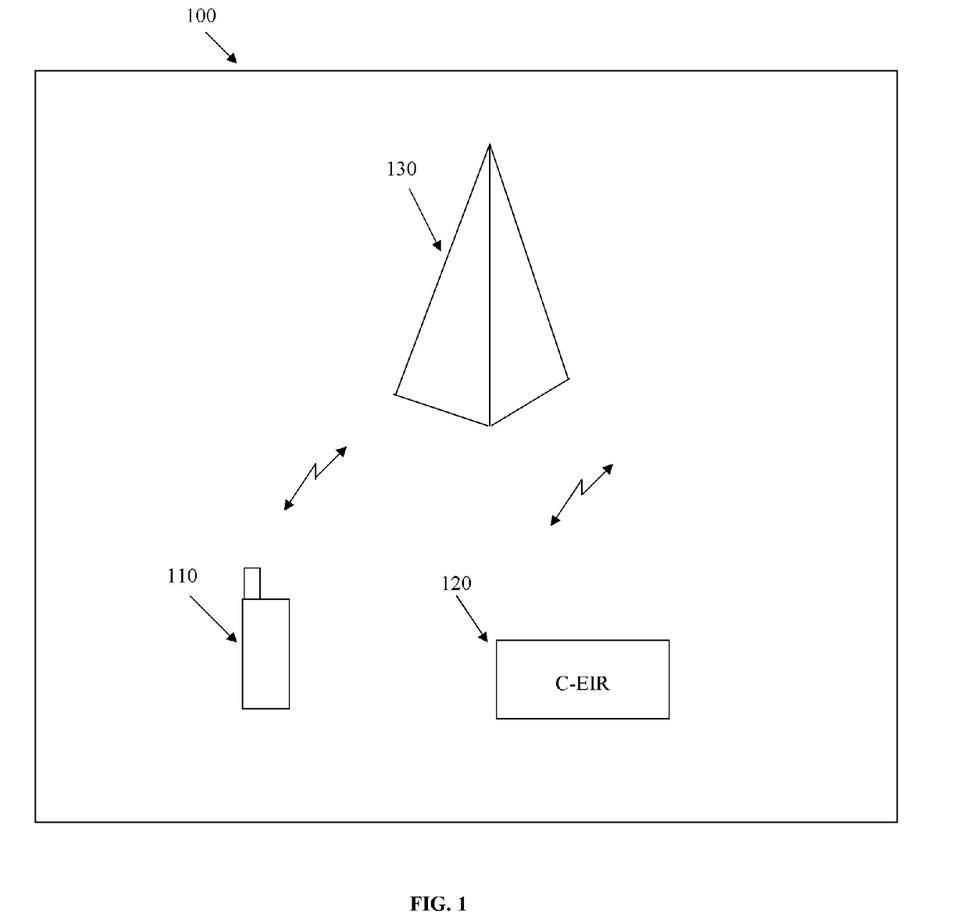
FIG. 1 is a schematic diagram of the system employing the mobile communication device and the centralized equipment identification register in communication over a network in accordance with the present invention.

FIG. 1 illustrates a system (100) employing the mobile communication device (110) and the centralized equipment identification register (120) in communication over a network (130).

Figure 2:
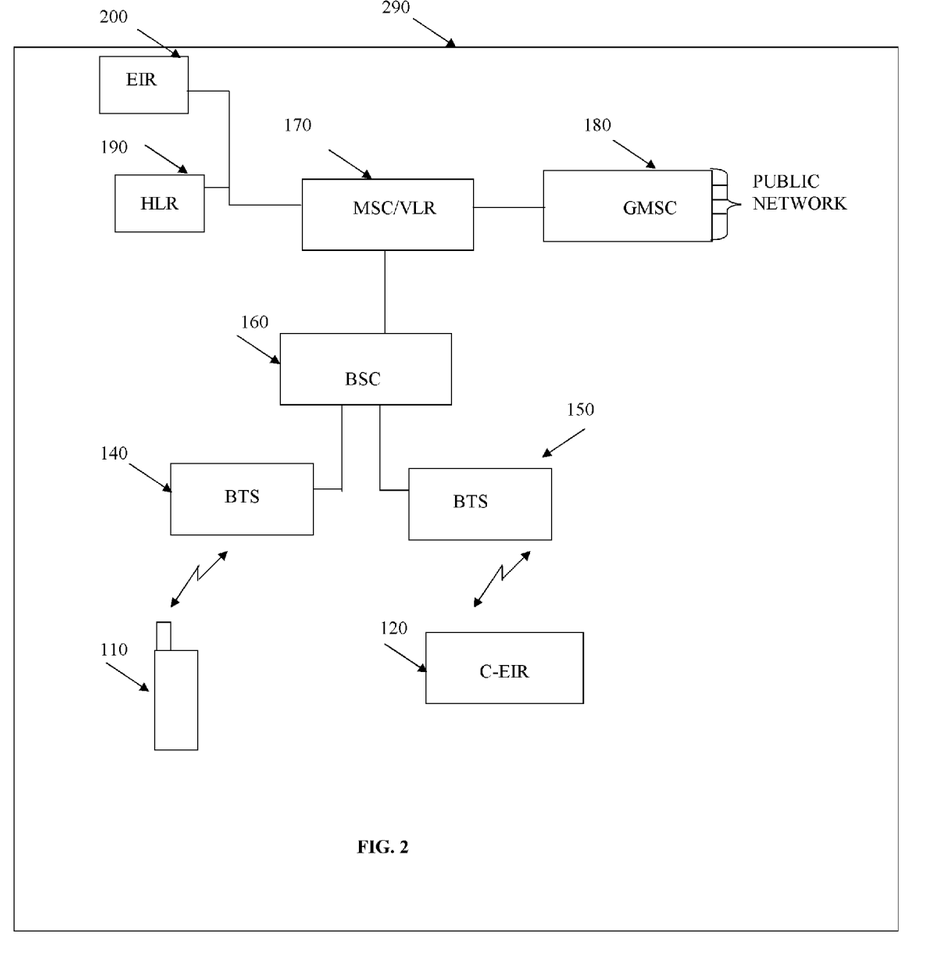
FIG. 2 is a schematic diagram of the system employing the mobile communication device and the centralized equipment identification register in communication over a network in accordance with the present invention, which is an illustrated GSM network.

FIG. 2 illustrates the system (100) employed in the GSM network (290) having mobile switching center (170) in communication with at least one base station controller (160) which is in communication with base transceiver stations (140, 150) in radio communication with the mobile communication device (110) and the centralized equipment identification register (120) wherein said mobile communication device (110) is operationally in communication with the centralized equipment identification register (120) over the communication network (290). However, the present invention may be implemented in any other communication network such as IP multimedia subsystem (IMS), Code division multiple access (CDMA), a wideband code division multiple access (WCDMA), or a universal mobile telecommunication system (UMTS).

Figure 3:
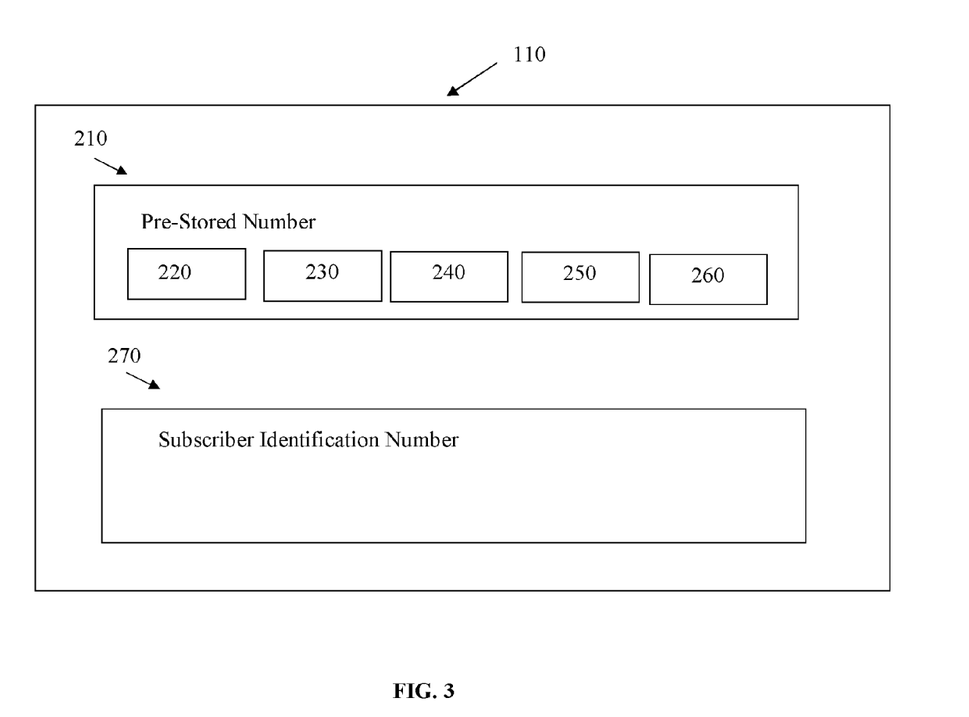
FIG. 3 is a schematic diagram of the mobile communication device in accordance with the present invention.

FIG. 3 is a schematic diagram of the mobile communication device (110) illustrating a means (220) for reading a pre-stored number, residing in a device memory (210) of a mobile communication device (110) wherein said pre-stored number is a value stored at the point of manufacture and a subscriber identification number stored in a subscriber identification storage module (270) of said mobile communication device (110) wherein the subscriber identification is an IMSI number or a private id, in the event said mobile communication device (110) powers on in a communication network (130), said means (220) for reading pre-stored number and subscriber identification number residing in said device memory (210) of said mobile communication device (110),a means (230) for comparing pre-stored number and subscriber identification number, said means (230) for comparing residing in said device memory (210) of said mobile communication device (110), a means (240) for triggering a message in the event said comparing means (230) finds the subscriber identification number not to correspond to said pre-stored number, a means (250) for transmitting a message to a centralized equipment identification register (C-EIR) (120) residing in said communication network (130), said message comprising said pre-stored number, said subscriber identification number and an equipment identification number, a means (260) for storing subscriber identification number in said device memory (210) by substituting said pre-stored number. It is to be understood that the mobile communication device (110) as herein mentioned includes any device in wireless communication with said communication network.

In the existing architecture wherein the deployment has dependency on deployment of EIR in the service provider networks, EIRs are used to block mobile phones if reported stolen or lost. However EIRs are either not deployed or if deployed cannot be connected to all other EIRs worldwide to form a network of EIR to trace stolen phones. If a mobile communication device moves from one service provider network to another, then to trace it, the EIRs of both the networks needs to be activated with IMEI of the stolen mobile communication device. This implies that if a mobile communication device is stolen we need to activate EIRs or all the operators worldwide to trace this phone as phone can go to any of the service provider network. To overcome this, the present invention teaches deployment of C-EIRs, as an SMS or SIP based application. C-EIR receives SMSes from all the devices whenever a particular trigger or criteria is hit on that device. Now on the mobile side, we need change in mobile software where mobile device will send an SMS to C-EIR on a particular trigger. This trigger for the case of present invention is mobile power on and change in SIM card of the device. Mobile device will remember the identity of the SIM card on each power cycle, on detecting change in identity of the SIM card, it will send an SMS to C-EIR which carries mobile device id (IMEI) and IMSI stored on the device as well as new IMSI. The address of C-EIR is configured (burnt into) into the mobile device software. Now it is assumed that stolen phones will change SIM card when it is used for the first time, hence whenever somebody steals a phone and changes his SIM card, C-EIR will receive an SMS with the IMEI of the phone.

Figure 4A:
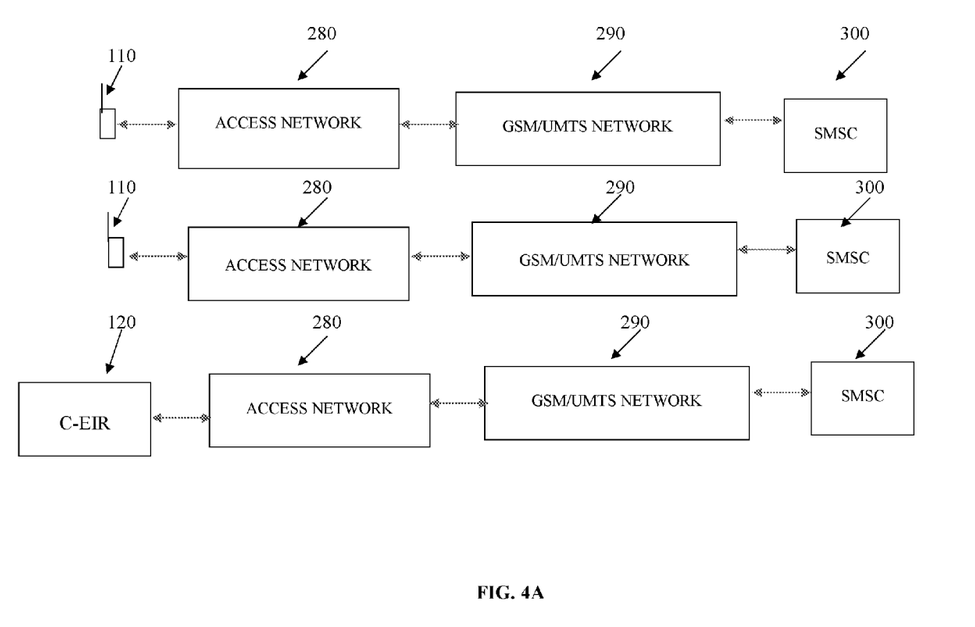
FIG. 4A is a schematic block diagram illustrating the proposed preferred solution implementation approach-1.
Figure 4B:
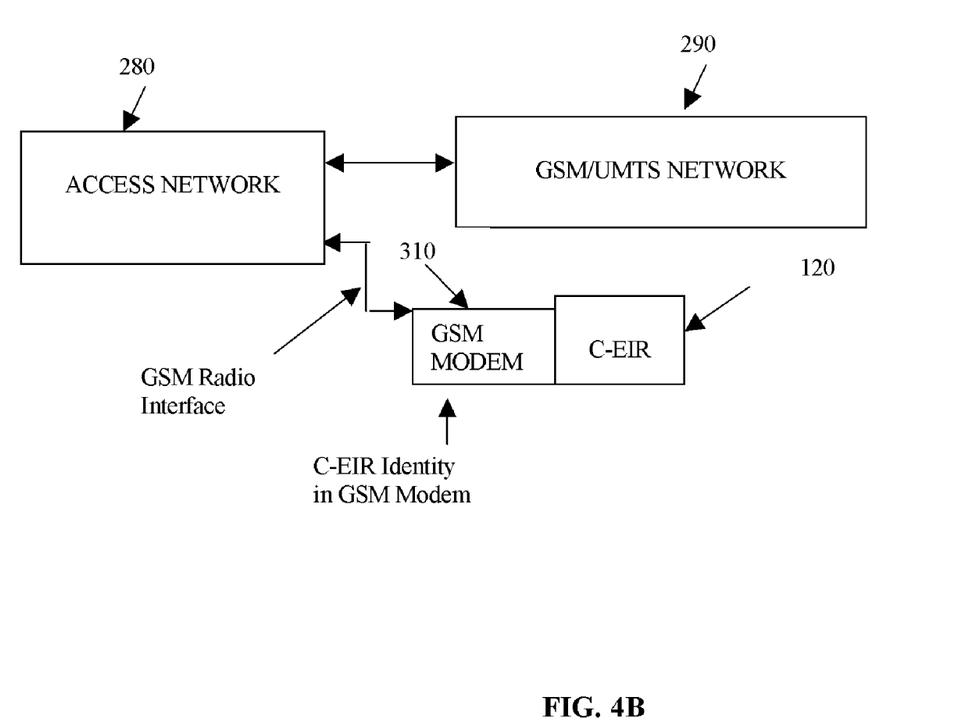
FIG. 4B is a schematic block diagram illustrates the network connectivity of the C-EIR, when placed in the GSM. Network.

C-EIRs can be operated by phone manufacturer or can be operated by consortium of phone manufacturer. It can also be operated by consortium of phone manufacturer and service providers FIG. 4A is a preferred embodiment of the present invention as the proposed solution implementation wherein the C-EIR (120) acts as a device to the GSM/UMTS network (290) network and can be accessed globally and FIG. 4B is a schematic block diagram illustrating the network connectivity of the C-EIR (120) when placed in the GSM/UMTS network (290), wherein C-EIR (120) is accessed by any phone globally so it is positioned in the network (290) where it need not be tied to any operator's access network (280). However in order to be reachable from any phone it needs to have an identity and that identity belongs to one of the operators. This identity is burnt into mobile phones as C-EIR address and is reachable from any network.(130). C-EIR (120) is thus, deployed in GSM/UMTS network (290) with GSM/UMTS interfaces in front, so it can be reached by any phone over GSM /UMTS network (290) with standard GSM identity, wherein the C-EIR identity is residing in the GSM modem (300)

Figure 5:
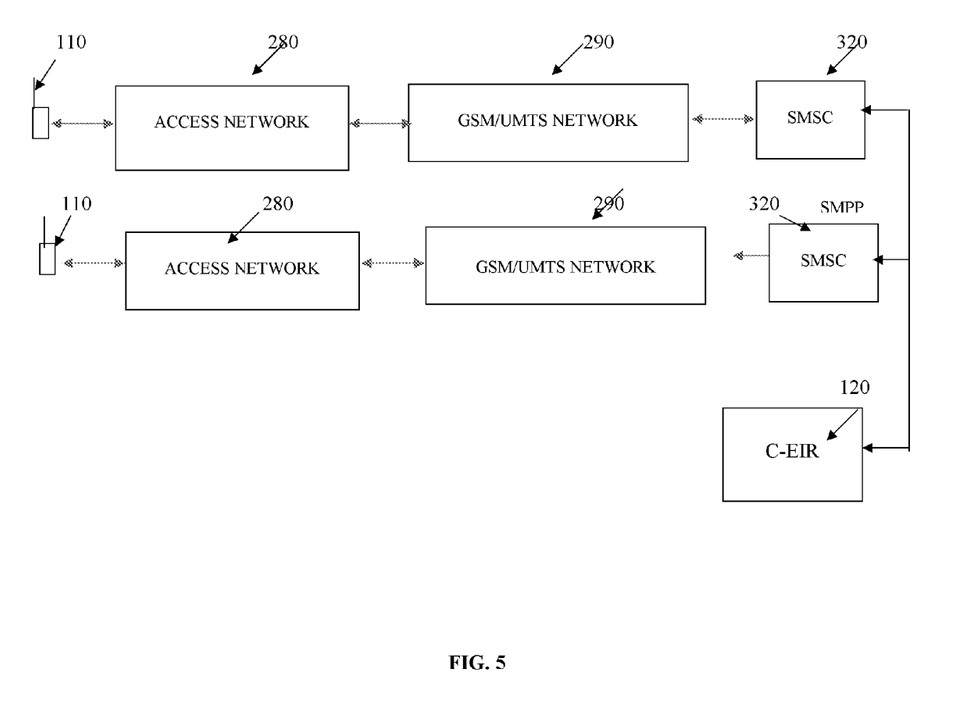
FIG. 5 is a schematic block diagram illustrating the solution implementation approach-2.

FIG. 5 is yet another embodiment of the present invention as the solution implementation wherein in this approach C-EIR (120) acts as an SMS application and is connected to the short message service centers (300) in the GSM/UMTS network (290) using SMPP and is globally accessible.

Figure 6:
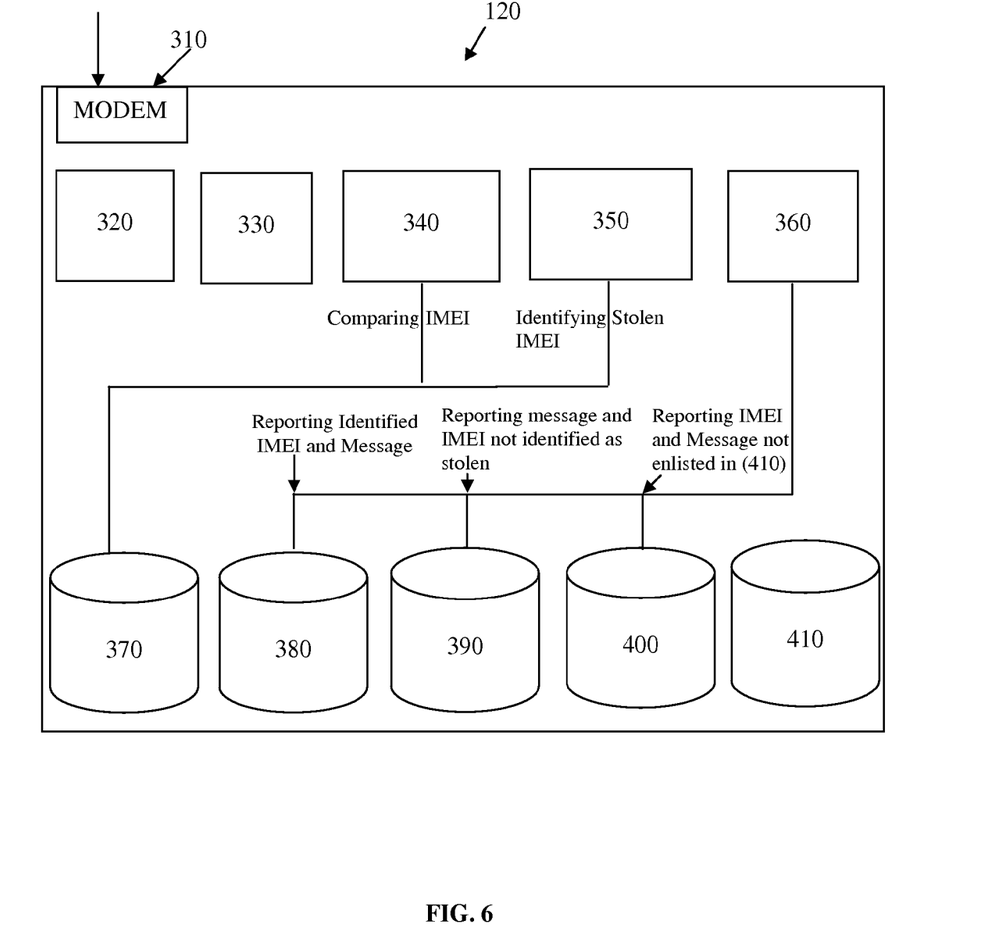
FIG. 6 is a schematic diagram illustrating the centralized equipment identification register in accordance with the present invention.

FIG. 6 is a schematic diagram illustrating the centralized equipment identification register (120) comprising a means (320) for receiving a message from said transmitting means (250), said receiving means (320) residing in said centralized equipment identification register (C-EIR) (120), a means (330) for reading a message, said means (330) for reading message residing in said centralized equipment identification register (C-EIR) (120), a means (340) for comparing equipment identification number retrieved from said message with equipment identification number enlisted in said centralized equipment identification register (C-EIR) (120) with any one of the plurality of the equipment identification numbers contained in a first repository (370) configurable to store equipment identification numbers corresponding to stolen mobile communication devices, said means (340) for comparing residing in said centralized equipment identification register (C-EIR) (120), a means (350) for identifying equipment identification numbers retrieved from said message corresponding to equipment identification numbers contained in said first repository (370) configurable to store equipment identification numbers corresponding to stolen mobile communication devices and a means (360) for reporting said identified equipment identification number to a second repository (380) configurable to receive said identified equipment identification number, wherein said second repository (380) is configurable to provide third party access to equipment identification numbers of stolen mobile communication devices. The means (360) for reporting further reports said message to a third repository (390) of equipment identification numbers not reported as stolen in the event the retrieved equipment identification number does not correspond to the equipment identification numbers contained in said first repository (370) of equipment identification numbers corresponding to stolen mobile communication devices. Further, the means (360) for reporting reports said message to a fourth repository (400) configurable to store said message in the event the retrieved equipment identification number is not enlisted in a fifth repository (410) configurable to store enlisted equipment identification numbers.

The system and method as implemented in accordance with the present invention can be extended to next generation networks to protect mobile phone theft for IMS based networks. It works on the same principle, where SIM is replaced by ISIM and SMS is replaced by SIP based message.

Figure 7A:
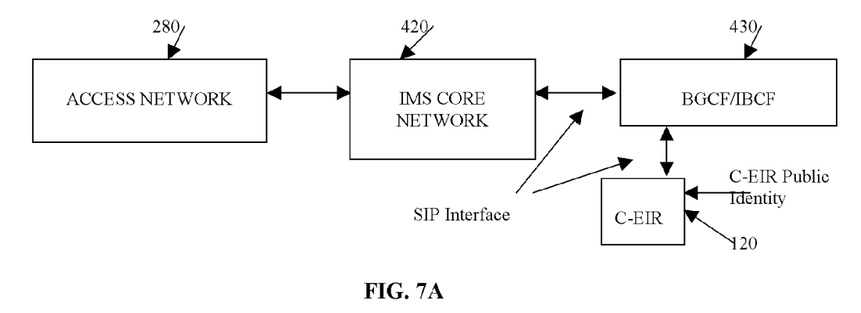
FIG. 7A is a schematic block diagram illustrating the network connectivity of the C-EIR, when placed in the IMS network wherein the C-EIR is not a part of the IMS core.
Figure 7B:
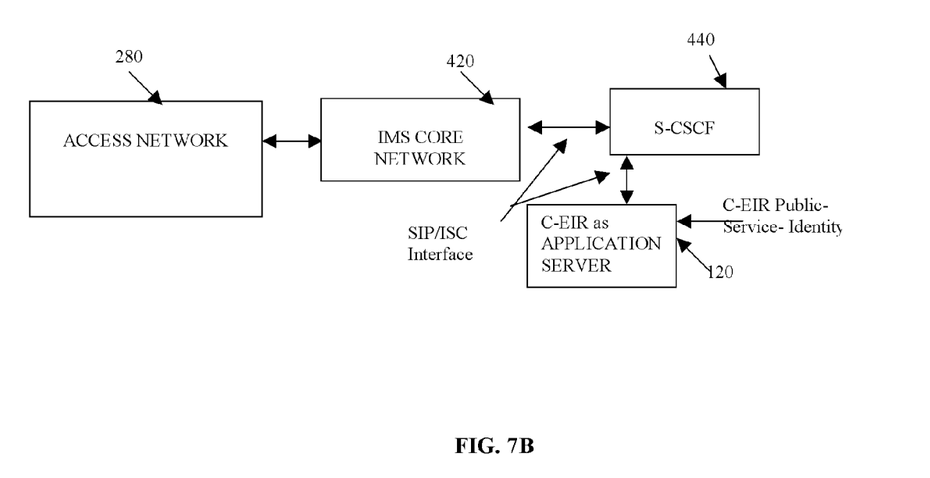
FIG. 7B is a schematic block diagram illustrating the network connectivity of the C-EIR, when placed in the IMS network wherein the C-EIR is a part of the IMS core.

FIG. 7A diagram illustrates the network connectivity of the C-EIR (120), when placed in the IMS core network (420) wherein the C-EIR (120) is not a part of the IMS core and FIG. 7B illustrates the network connectivity of the C-EIR (120), when placed in the IMS core network (420) wherein the C-EIR (120) is a part of the IMS core. C-EIR (120) is deployed as an application server and has public-service-identity and is part of IMS core network (420).

Figure 8:
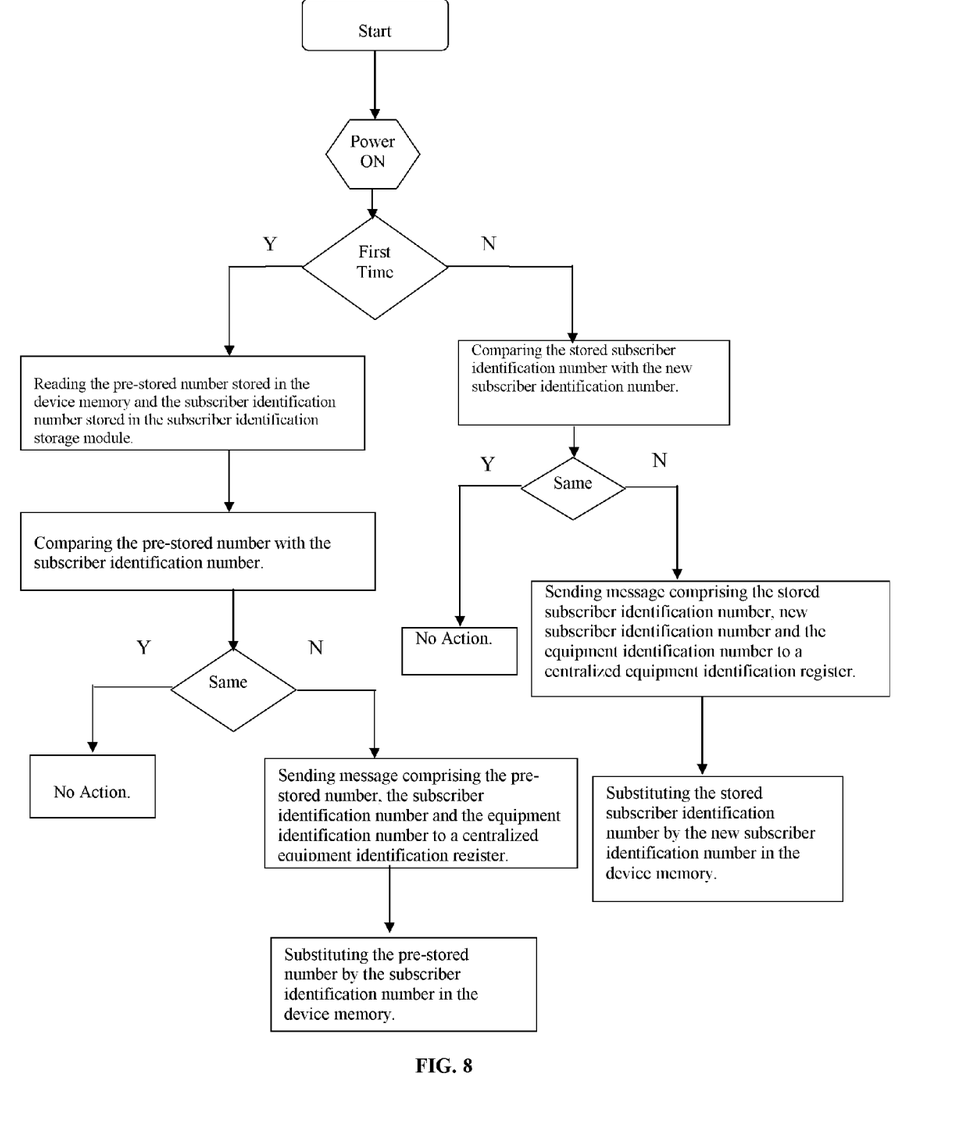
FIG. 8 is a flow diagram illustrating the process implemented by the device operable in accordance with the present invention.

FIG. 8 is the flow diagram illustrating the process implemented by the device operable in accordance with the present invention comprising the steps as recited herein. On powering on the device first time in the communication network, reading a pre-stored number residing in a device memory of a mobile communication device and a subscriber identification number stored in a subscriber identification storage module of said mobile communication device by a means for reading pre-stored number and subscriber identification number, comparing said pre-stored number and said subscriber identification number by a means for comparing pre-stored number and said subscriber identification number. In the event the pre-stored number is not same as the subscriber identification number sending said message to a centralized equipment identification register (C-EIR) residing in said communication network said message comprising said pre-stored number, said subscriber identification number and an equipment identification number. The new subscriber identification number is then stored in the device memory by substituting the pre-stored number with the new subscriber identification number and repeating the above said steps.

The C-EIR's address is stored in the encrypted format wherein the address of C-EIR is either a GSM mobile number or SMPP address or SIP address for GSM and IMS networks burnt into the device for message communication from mobile to C-EIR. The invention can be implemented in software wherein when the device is powered on for the first time said software records IMSI on the SIM card and IMEI of the device in memory. When device is powered subsequently either casually or because its stolen and SIM card is changed, software notices change in IMSI on the SIM card and prepares a message (SMS) which contains new IMSI and IMEI of the device and sends this message to C-EIR wherein SMS is used as a message to report SIM change in GSM networks as defined by GSM Specifications (ETSI) and SIP Message is used as a message to report ISIM/SIM change in IMS networks as defined by 3GPP specifications for IMS. Optionally it communicates any additional data e.g. last 2 dialed numbers, last 2 received calls, last SMSs sent and received numbers etc.

IMSI is a GSM specific identity, which identifies subscriber's SIM card and private-id an IMS specific identity that identifies subscriber's ISIM card. Both SIM and ISIM cards identify subscription of the subscriber with a service provider and are needed to avail services from GSM and IMS networks respectively.

Figure 9:
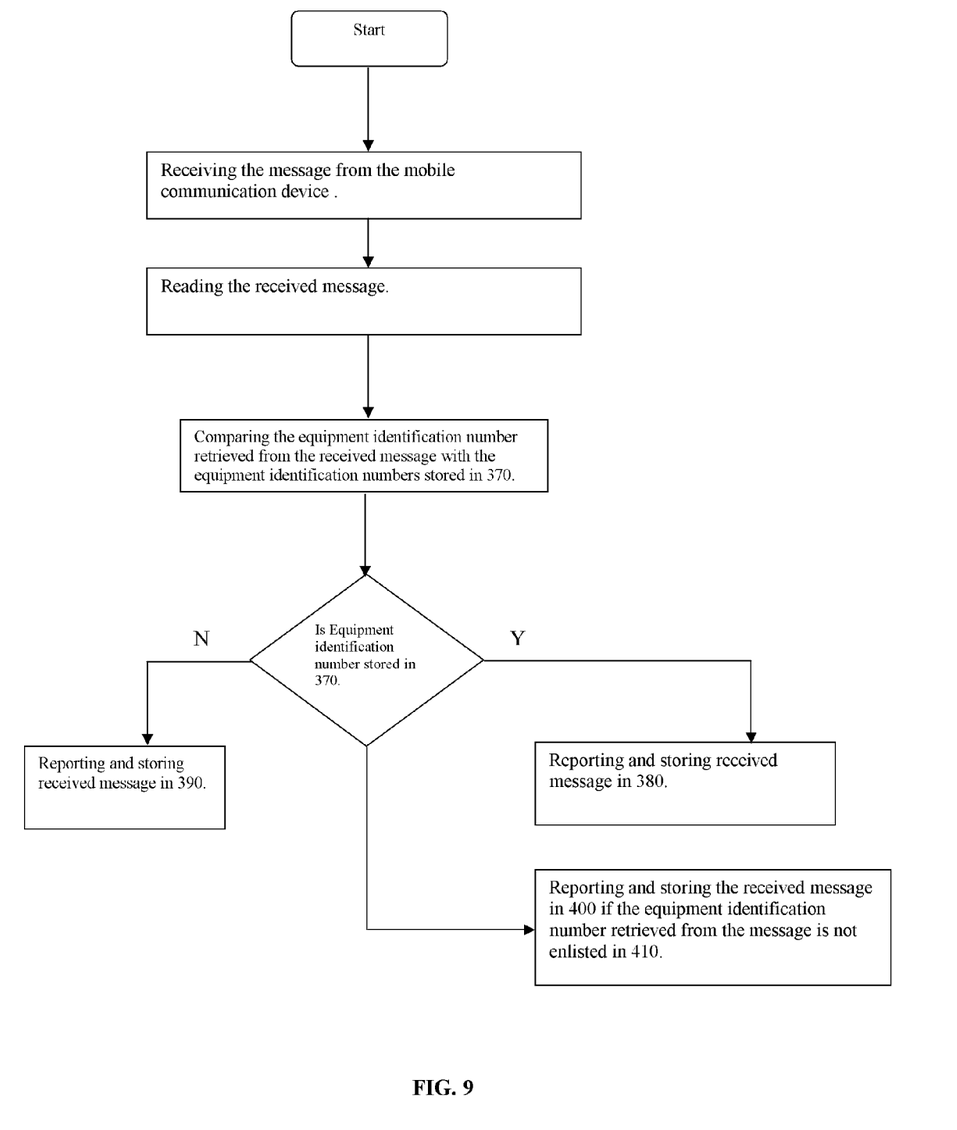
FIG. 9 is a flow diagram illustrating the process implemented by the C-EIR operable in accordance with the present invention.

FIG. 9 is a flow diagram illustrating the process implemented by the C-EIR operable in accordance with the present invention comprising the steps of receiving said message from the mobile communication device, reading said message by a means for reading a message, comparing said equipment identification number retrieved from said message with any one of the plurality of the equipment identification numbers contained in a repository of equipment identification numbers corresponding to stolen mobile communication devices (370), identifying the equipment identification number retrieved from said message corresponding to equipment identification numbers contained in a first repository of equipment identification numbers corresponding to stolen mobile communication devices (370) and reporting said identified equipment identification number of stolen mobile communication devices to a second repository configured to receive and store said identified equipment identification number (380), wherein said second repository (380) is configurable to provide third party access to equipment identification numbers of stolen mobile communication devices. Further, reporting said message to a third repository (390) configurable to store equipment identification numbers not reported as stolen, in the event the equipment identification number retrieved from said message does not correspond to the equipment identification numbers contained in said first repository (370) configurable to store equipment identification numbers corresponding to stolen mobile communication devices. Further, reporting said message to a fourth repository (400) configurable to store said message in the event said equipment identification number retrieved from said message is not enlisted in a fifth repository (410) configurable to store said enlisted equipment identification numbers.

The C-EIRs are configured with mobiles sold in the market When a mobile is stolen its IMEI [considering GSM mobile phone as an example] is configured as stolen IMEI on C-EIR. When message is received from mobile, C-EIR compares the IMEI contained in the message with configured IMEIs, if IMEI is of a stolen mobile, an alarm is generated and message is stored in a separate database. If IMEI is configured but not marked a stolen, message is still stored for records but no alarm is generated. However if IMEI is not among the configured ones, message is still stored as it is a message from known software but added to a separate database (stray message database). Whenever IMEI of stolen mobile is configured on C-EIR, at that time this IMEI is also checked in stray message database for possible message reported.

C-EIRs, thus generate alarm locally for operator to take action. However as enhancement C-EIRs can be connected to any network (e.g. internet) over any interface (e.g. HTTP or WAP etc.) to report these alarms to any operator terminal or can also be reported to legal or law enforcement agencies. These interfaces are not standardized and can be defined. Further, since C-EIRs use standard interfaces (GSM radio interface, SMPP interface for GSM networks and SIP/ISC interface for IMS networks), they are interoperable with any deployed networks. Thus, whenever a phone is stolen or lost, user can make a request to C-EIR, which will trace the phone whenever it is powered on with a new SIM card. C-EIR enables to identify the IMSI or phone number of the user, thus enabling the detection of the stolen mobile communication device.

Although the present invention has been described hereinabove with reference to the various embodiments of the invention, the same should not be construed as limiting the invention and it would be apparent to a person skilled in the art that various modifications are possible within the scope of the present invention. While the principles of the invention have been described above in connection with specific apparatus, it is to be clearly understood that this description is made only by way of example and not as a limitation on the scope of the invention.

The present invention is concerned with defining an architecture and implementation, which can overcome the shortcomings of GSM or mobile networks to discourage mobile theft, and allows tracing of stolen or lost phones.

The preferred embodiments of the invention is described in respect of a GSM system. However the invention is not to be understood as being limited to this radio system.

Depending on the implementation, the equipment check can be systematic, for example as known in the prior art it can be carried out every time a radio channel is allocated, or it can be carried out only in certain situations, for example in connection with location updating or when an call session is established. However the present invention provides an improved system and method to enable equipment check on every power cycle of the mobile communication device.

| List of Abbreviations: | |
| --- | --- |
| GSM: | Global System for Mobile Communication |
| IMEI: | International Mobile Equipment Identity |
| IMSI: | International Mobile Subscriber Identity |
| EIR: | Equipment Identity Register. |
| IMS: | IP Multimedia Subsystems. |
| SIM: | Subscriber Identity module |
| ISIM: | IMS SIM |
| SMPP: | Short Message Peer to Peer |
| SIP: | Session Initiation Protocol |
| ISC: | IMS Service Control |
| BGCF: | Border Gateway Control function |
| IBCF: | Interconnect Border Control function. |
| CSCF: | Call Session Control Function |
| SMSC: | Short Message Service Center |
| ETSI: | European telecommunications Standard Institute |
| 3GPP: | $3^{rd}$ Generation Partnership Project. |
| HTTP: | Hypertext Transfer protocol |
| WAP: | Wireless Application Protocol |
| WCDMA: | Wideband code division multiple access |
| UMTS: | Universal mobile telecommunications system. |

I claim:

1. A method enabling detection of stolen mobile communication devices, the method comprising the steps of:
   (a) reading a pre-stored number residing in a device memory of a mobile communication device and a subscriber identification number stored in a subscriber identification storage module of said mobile communication device by a means for reading pre-stored number and subscriber identification number in the event of said mobile communication device powering on in a communication network, said means for reading residing in said device memory of said mobile communication device;
   (b) comparing said pre-stored number and said subscriber identification number by a means for comparing pre-stored number and subscriber identification number, said means for comparing residing in said device memory of said mobile communication device;
   (c) triggering a message by a means for triggering a message in the event said comparing means finds said subscriber identification number not to correspond to said pre-stored number;
   (d) transmitting said message to an operator independent centralized equipment identification register (C-EIR) by a means for transmitting messages, wherein said C-EIR is independent of an operator of the communication network and accessible globally to multiple communication networks, said message comprising said pre-stored number, said subscriber identification number and an equipment identification number, wherein said message is delivered to said C-EIR directly from the mobile communication device;
   (e) a means for storing subscriber identification number and repeating steps (a), (b), (c) and (d) above, wherein when said steps of (a), (b), (c) and (d) are performed said pre-stored number is substituted by said subscriber identification number by said means for storing subscriber identification number;
   (f) receiving said message from said transmitting means by a means for receiving a message, said receiving means residing in said centralized equipment identification register (C-EIR);
   (g) reading said message by a means for reading a message, said means for reading a message residing in said centralized equipment identification register (C-EIR);
   (h) comparing said equipment identification number retrieved from said message with equipment identification number enlisted in said centralized equipment identification register (C-EIR) by a means for comparing equipment identification number with any one of the plurality of the equipment identification numbers contained in a repository of equipment identification numbers corresponding to stolen mobile communication devices, said means for comparing residing in said centralized equipment identification register (C-EIR);
   (i) identifying the equipment identification number retrieved from said message corresponding to equipment identification numbers contained in a first repository of equipment identification numbers corresponding to stolen mobile communication devices and reporting said identified equipment identification number of stolen mobile communication devices by a means for reporting identified equipment identification number to a second repository configured to receive said identified equipment identification number, wherein said second repository is configurable to provide third party access to equipment identification numbers of stolen mobile communication devices.

2. The method as claimed in claim 1, further comprising the step of:
   storing said equipment identification number in said device memory by said means for storing.

3. The method as claimed in claim 1, wherein said pre-stored number is a value stored at the point of manufacture.

4. The method as claimed in claim 1, wherein said mobile communication device includes any device in wireless communication with said communication network.

5. The method as claimed in claim 1, wherein said communication network comprises a global system for mobile communication (GSM), IP multimedia subsystem (IMS), Code division multiple access (CDMA), a wideband code division multiple access (WCDMA), or a universal mobile telecommunications system (UMTS).

6. The method as claimed in claim 1, wherein said subscriber identification is an IMSI number for GSM network or a private id in the case of IMS network.

7. The method as claimed in claim 1, wherein said subscriber identification number and said equipment identification number are stored in an encrypted format.

8. The method as claimed in claim 1, wherein the centralized equipment identification register (C-EIR) address is stored in an encrypted format.

9. The method as claimed in claim 1, wherein said C-EIR is an SMS or SIP based application.

10. The method as claimed in claim 1, further comprising the step of:
    reporting said message to a third repository configurable to store equipment identification numbers not reported as stolen by a means for reporting said message, in the event the equipment identification number retrieved from said message does not correspond to the equipment identification numbers contained in said first repository configurable to store equipment identification numbers corresponding to stolen mobile communication devices.

11. The method as claimed in claim 10, further comprising the step of:
    reporting said message to a fourth repository configurable to store message by a means for reporting in the event said equipment identification number retrieved from said message is not enlisted in a fifth repository configurable to store enlisted equipment identification numbers.

12. The method as claimed in claim 1, wherein said C-EIR is deployed as a direct device in the network.

13. The method as claimed in claim 1, wherein said C-EIR having public-identity is connected to the IMS network over SIP interface.

14. The method as claimed in claim 1, wherein said C-EIR having public-service-identity is deployed as an application server as a part of the IMS core network.

15. The method as claimed in claim 1, wherein said C-EIR address is configurable by a manufacturer, an operator or a user.

* * * * *